United States Patent [19]

Samuel

[11] Patent Number: 5,687,984
[45] Date of Patent: Nov. 18, 1997

[54] COLLAPSING CART

[76] Inventor: Violet S. Samuel, P.O. Box 2565, Laguna Hills, Calif. 92654

[21] Appl. No.: 510,501

[22] Filed: Aug. 2, 1995

[51] Int. Cl.⁶ .................................................. B62B 3/02
[52] U.S. Cl. ....................... 280/641; 280/651; 280/42; 280/644
[58] Field of Search ..................... 280/641, 39, 642, 280/42, 651, 655.1, 47.34, 47.371, 79.11, DIG. 3, 644; 135/67

[56] References Cited

U.S. PATENT DOCUMENTS

| | | | |
|---|---|---|---|
| 1,164,332 | 12/1915 | Brown | 280/79.11 |
| 2,384,873 | 9/1945 | Barksdale | 280/641 |
| 2,537,909 | 1/1951 | Puddester | 280/79.11 |
| 2,792,874 | 5/1957 | Sundberg | 135/67 |
| 2,805,078 | 9/1957 | Robinson | 280/79.11 |
| 2,841,407 | 7/1958 | Amao | |
| 2,872,967 | 2/1959 | Kirkpatrick | |
| 2,890,060 | 6/1959 | Ott et al. | 280/655.1 |
| 2,961,250 | 11/1960 | Beach | 280/79.11 |
| 2,992,833 | 7/1961 | Hoedinghaus et al. | 280/641 |
| 3,736,021 | 5/1973 | MacLaren | 280/39 |
| 3,827,708 | 8/1974 | Derry | |
| 4,266,807 | 5/1981 | Griffin | 280/644 |
| 4,659,096 | 4/1987 | Leimgruber | 280/39 |
| 4,765,644 | 8/1988 | Bell | |
| 4,878,682 | 11/1989 | Lee | 280/42 |
| 5,016,893 | 5/1991 | Hart, Jr. | 280/39 |
| 5,020,560 | 6/1991 | Turbeville | 135/67 |
| 5,348,336 | 9/1994 | Fernie et al. | |
| 5,370,408 | 12/1994 | Eagan | 280/642 |
| 5,388,852 | 2/1995 | Bigo et al. | 280/642 |
| 5,409,028 | 4/1995 | Lee | 135/67 |

FOREIGN PATENT DOCUMENTS

| | | | |
|---|---|---|---|
| 1293750 | 12/1991 | Canada | |
| 2056148 | 5/1993 | Canada | 135/67 |
| 2618400 | 1/1989 | France | |
| 2180508 | 4/1987 | United Kingdom | |

*Primary Examiner*—Eric D. Culbreth
*Assistant Examiner*—Min Yu
*Attorney, Agent, or Firm*—Stephen R. Greiner

[57] ABSTRACT

A collapsing cart for wheeled transport of diverse items over the ground surface. The cart includes a pair of side members having handlebars for grasping by a user and a number of ground-engaging wheels for movement. A number of lateral struts join the side members together. A flexible article carrier is suspended from two of the lateral struts. In the event that the cart is to be used on unconsolidated or uneven surfaces, an auxiliary carriage having load-distributing rollers may be secured beneath the wheels.

15 Claims, 3 Drawing Sheets

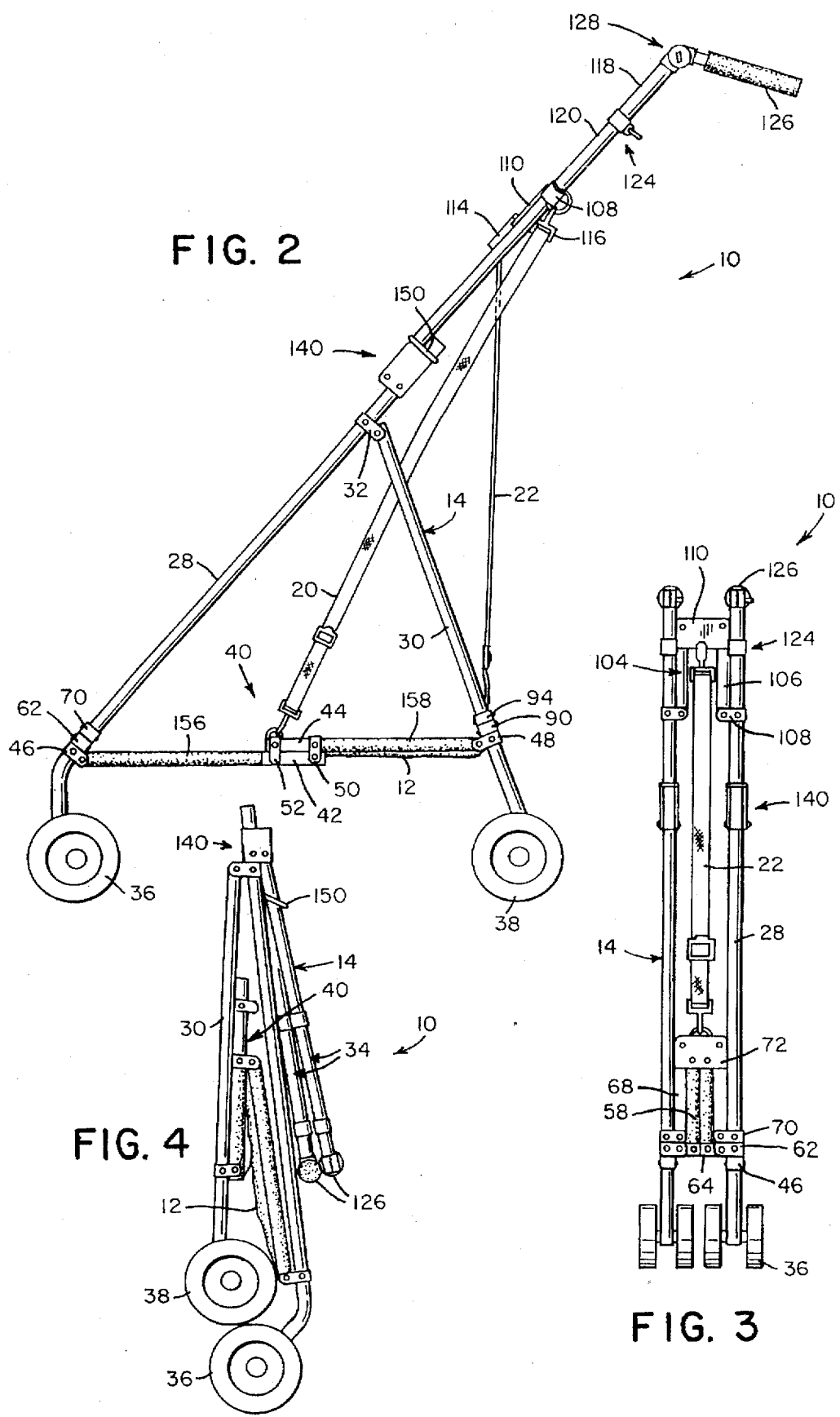

COLLAPSING CART

FIELD OF THE INVENTION

The present invention relates generally to land vehicles and, more particularly, to a wheeled cart having a selectively collapsible frame for compact storage.

BACKGROUND OF THE INVENTION

Walking aids have long been used to steady elderly and handicapped individuals desiring to walk under their own power. Recent improvements to such walking aids include the addition of a relatively large container, for personal belongings, to a folding frame permitting storage in a closet or automobile trunk when not in use. Although the improved walking aids closely resemble a cart in both function and appearance, and appeal to those too embarrassed to use a conventional walker, such are not altogether satisfactory for their intended users.

The prior art walking aids are generally deficient in several ways. First, the nonadjustable handlebar structure incorporated into the frames of most walking aids cannot fully accommodate the physical peculiarities of an individual user. Thus, a user being unable to easily grasp the walking aid may be unduly fatigued and, perhaps, caused bodily injury during an otherwise avoidable fall. Most walking aids are also unstable on unconsolidated soils and grass thereby greatly restricting the range that a user may travel. A stroll across a sandy beach or a lawn has, heretofore, been difficult at best. Finally, when storage of the conventional walking aid is required, few collapse or fold both laterally and longitudinally for truly compact storage. Those walking aids that do fold in this manner are complex in construction and difficult for the elderly and handicapped to manipulate without assistance.

SUMMARY OF THE INVENTION

In light of the deficiencies presented by the prior art walking aids, it is a principal object of the invention to provide a cart of uncomplicated and lightweight construction which may be readily utilized by elderly and handicapped individuals as a walking aid. The cart of the present invention features: a pair of laterally-joined side members each having an adjustable handlebar for grasping by a user, a plurality of ground-engaging wheels carried on the side members, and a flexible article carrier suspended from the frame for carrying diverse items such as a folding seat or groceries.

It is a further object of the invention to provide a collapsing cart wherein its lateral folding or collapsing function may be accomplished by a user in one easy motion. In this regard, the collapsing cart of the invention features lateral struts including a pair of arms having their inner ends hingedly secured together and their outer ends secured to a pair of laterally-joined side members. A first flexible strap is suspended between the handlebars and connected to each of the lateral struts so that the application of an upward force to the first flexible strap will cause articulated movement of the pair of arms collapsing the cart laterally.

It is another object of the invention to provide a collapsing cart of the type described wherein its longitudinal folding or collapsing function may be accomplished by a user in essentially the same motion as that required for lateral collapse. Thus, each laterally-joined side member also features: a forward leg carrying one of the ground-engaging wheels, a rearward leg hingedly connected to the forward leg and carrying another of the ground-engaging wheels, and a longitudinal strut having opposed ends, one of the ends secured to the forward leg and the other of the ends secured to the rearward leg. A second strap is suspended between the handlebars and has opposed ends connected to each of the longitudinal struts whereby the application of an upward force to the second strap at a position between the handlebars will cause articulated movement of the longitudinal struts to collapse the cart longitudinally.

Still another object of the invention is to provide a cart having fully adjustable handlebars so as to accommodate the physical peculiarities of a user by telescoping in length and pivoting angularly. The handlebars thus feature: a lower tubular portion having an opening therein, an upper portion slidably engaged within the opening, and means for restricting the size of the opening so as to clamp the upper portion in place. The handlebars further include a handgrip pivotally secured to the upper portion.

So that the cart of the present invention may be utilized on terrain of all types, it may be secured to an auxiliary carriage comprising: a pair of conjoined platform members having an upper surface adapted for receiving and supporting the cart above the ground surface, a plurality of ground-engaging rollers carried by each of the platform members, and means for securing the side members to the pair of platform members.

It is an object of the invention to provide improved elements and arrangements thereof in a cart for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The present invention may be more readily described with reference to the accompanying drawings, in which:

FIG. 2 is a side elevational view of the collapsing cart.

FIG. 3 is a front elevational view of the cart in a collapsed orientation.

FIG. 4 is a side elevational view of the cart in a collapsed orientation.

Similar reference characters denote corresponding features consistently throughout the accompanying drawings.

DETAILED DESCRIPTION OF THE PREFERRED EMBODIMENT

Figure 1:
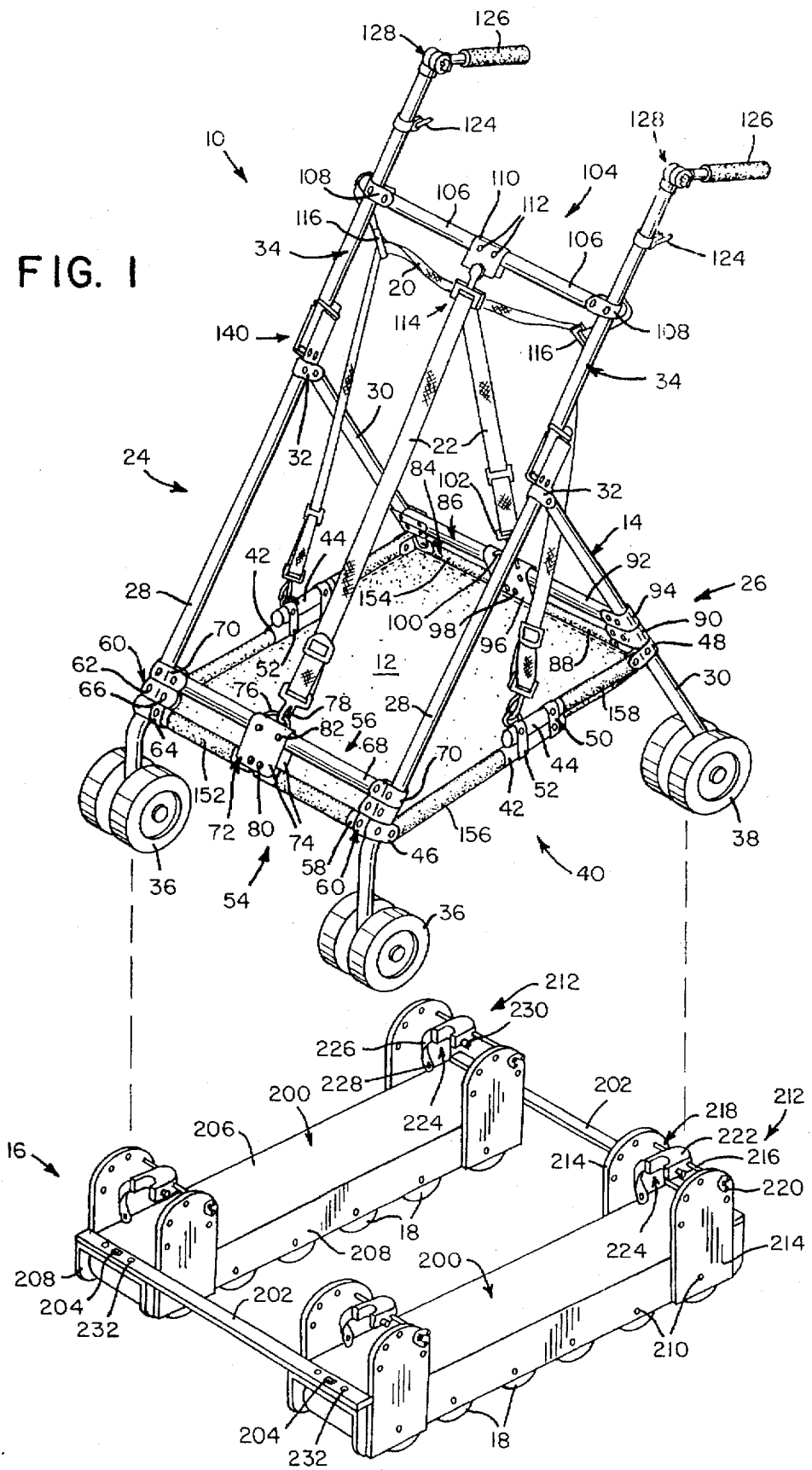
FIG. 1 is a perspective view of a collapsing cart in accordance with the present invention shown with its auxiliary carriage.

Referring now to FIG. 1, a collapsing cart in accordance with the present invention is shown generally at 10. The preferred cart 10 includes a flexible article carrier 12 secured to a wheeled frame 14 constructed principally from lightweight metallic tubing. For movement of the cart 10 over uneven or unconsolidated surfaces, the frame 14 may be selectively secured to an auxiliary carriage 16 having a plurality of load-distributing and ground-engaging rollers 18. When being stored or transported in a vehicle, the cart 10 may be collapsed both laterally and longitudinally by the application of an upward force to a pair of flexible straps 20 and 22 suspended from the frame 14 for this purpose.

The frame 14 includes a pair of laterally spaced side members 24 and 26. Preferably, each of the side members 24 and 26 is provided with a forward leg 28 and rearward leg 30 pivotally connected together in the form of an inverted "V" by a hinge 32. Extending upwardly from each forward leg 28 is an adjustable handlebar 34 by means of which a user may apply a pushing or pulling force to the frame 14 to move the cart 10 and simultaneously support himself or herself.

For relatively effortless movement of the cart 10 over the ground surface, the bottom ends of the forward legs 28 and rearward legs 30 are provided, respectively, with paired wheels 36 and 38 of conventional construction. The wheels 36 secured to the forward legs 28 preferably pivot about a vertical axis thereby permitting the cart 10 to be easily steered. The wheels 38 secured to the rearward legs 30, on the other hand, are preferably of the non-pivoting type. If desired, the two rear wheels 38 may be equipped with conventional braking mechanisms (not shown) adapted for actuation by a user.

Longitudinal struts 40 connect the lower ends of the forward leg 28 and rearward leg 30 of each side member 24 and 26 together. Each of the longitudinal struts 40 preferably includes a forward arm 42 and a rearward arm 44 of tubular construction which may articulated so as to allow the frame 14 to be collapsed longitudinally. As shown, the forward arm 42 is pivotally connected by a hinge 46 to the forward leg 28 and the rearward arm 44 is pivotally connected by a hinge 48 to the rearward leg 30. The two arms 42 and 44 are pivotally connected together in partially overlapping fashion by a hinge 50 with a portion of the rearward arm 44 falling upon the forward arm 42.

A guide bracket 52 having a shape similar to that of an inverted "U" is secured to the front end of the arm 44. The two downwardly extending fingers of the guide bracket 52 ensure the proper alignment of the forward and rearward arms 42 and 44 as well as reinforce the hinge 50 against inadvertent lateral blows during use of the cart 10.

At the front of the frame 14, the side members 24 and 26 are joined by a first pair of lateral struts 54 and 56 which are horizontally disposed, one above the other. The lower strut 54 includes a pair of tubular arms 58, the outer ends of which are secured by articulating hinges 60 to the lower ends of forward legs 28. Preferably, each of the articulating hinges 60 comprises a pair of C-shaped brackets 62 and 64 pivotally secured together by a pivot pin 66 through their respective ends. The upper strut 56, on the other hand, includes a pair of tubular arms 68 having their outer ends secured by hinges 70 to the lower ends of forward legs 28. The inward ends of the arms 58 and 68 are connected, respectively, to a central bracket 72 for tandem movement.

With continuing reference to FIG. 1, the central bracket 72 may be seen to comprise a metallic or plastic sheet formed into a C-shape. As illustrated, the central bracket 72 preferably includes a pair of rectangular plates 74 spaced to receive the inward ends of the arms 58 and 68 therebetween. A semicircular coupling 76 is secured to the bracket 72 at the junction between the rectangular plates 74 and extends above the central bracket 72 and lateral struts 54 and 56 for attachment of the flexible strap 22 by means of clip 78.

Pivot pins 80 and 82 are positioned within cooperating bores (not shown) extending through the inward ends of the arms 58 and 68 and plates 74 to pivotally secure such together. The pivot pins 80 and 82 are spaced from one another in such a fashion that the arms 58 and 68 can be articulated from a spaced, horizontal orientation for use of the cart 10 to an adjacent, vertical orientation for storage as illustrated in FIG. 3. Thus, the lower pivot pins 80 are preferably spaced from one another at a distance substantially equivalent to the outside diameter of the tubing comprising each of the arms 58. The upper pivot pins 82, on the other hand, are spaced from one another at a distance substantially equivalent to the sum of the outside diameters of the tubing comprising one arm 58 and one arm 68.

At the rear of the frame 14, the side members 24 and 26 are joined by a second pair of lateral struts 84 and 86 substantially identical in construction to the first pair of lateral struts 54 and 56 described hereinabove. In this regard, a lower strut 84 is provided with a pair of tubular arms 88, the outer ends of which are secured by articulating hinges 90 to the lower ends of rearward legs 30. The upper strut 86 is also provided with a pair of tubular arms 92 having their outer ends secured by hinges 94 to the lower ends of rearward legs 30. The inward ends of the arms 88 and 92 are pivotally connected to a C-shaped, central bracket 96 by pivot pins 98 for tandem movement. A semicircular coupling 100 is secured to the top of the bracket 96 for attachment of the flexible strap 22 by means of clip 102.

A single lateral strut 104 preferably connects the handlebars 34 together. The lateral strut 104 includes a pair of tubular arms 106, the outer ends of which are secured by hinges 108 to the handlebars 34. The inward ends of the paired arms 106 are pivotally connected to a C-shaped, central bracket 110 by pivot pins 112. As may best be seen with reference to FIG. 2, clasp 114 secures the flexible strap 22 to the bracket 110. Clasps 116, suspended from hinges 108, retain the central portion of strap 20 adjacent bracket 110 and within easy reach of a user.

Figure 5:
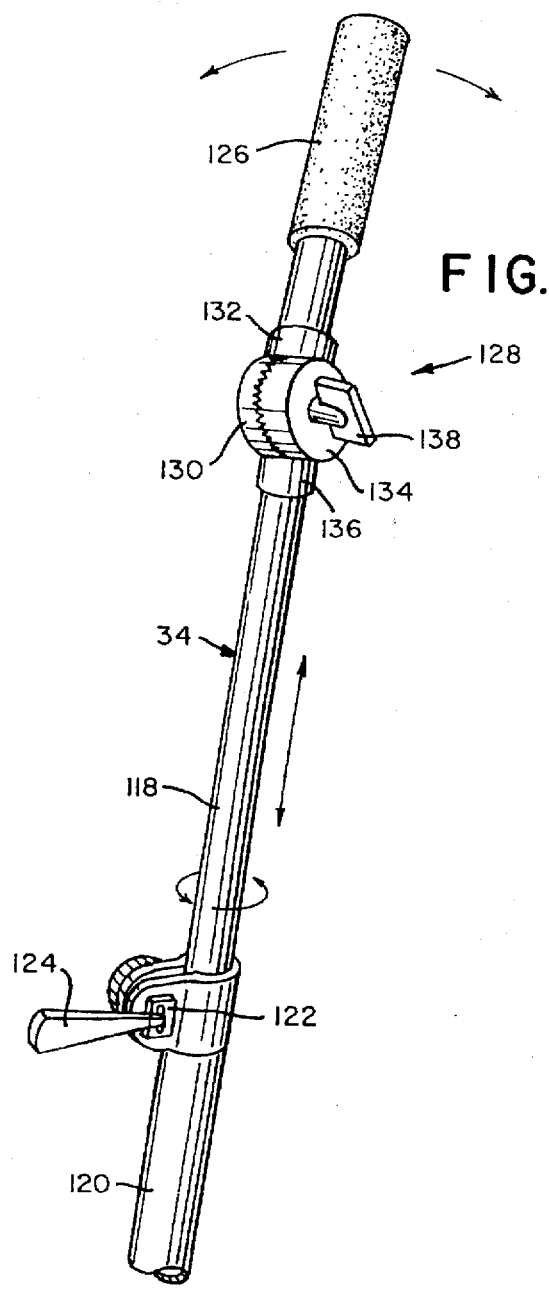
FIG. 5 is a perspective view of a handlebar showing details of its telescoping, rotating and pivoting features.

As illustrated in FIG. 5, the handlebars 34 are preferably of telescopic construction so as to suit the needs of an individual user who may be elderly or handicapped. The handlebars 34, then, preferably include upper portions 118 of reduced diameter slidably engaged within lower portions 120. The position of the upper portions 118 relative to the lower portions 120 may be fixed by means of a jam nut 122 selectively engageable by lever 124.

Each of the padded, tubular handgrips 126 provided for grasping by a user is secured to the upper portion 118 of a handlebar 34 by a pivot mechanism 128. The pivot mechanism 128 preferably includes a first radially-toothed cylinder 130 secured by means of an integral neck 132 to handgrip 126. A second radially-toothed cylinder 134 is similarly secured by an integral neck 136 to the upper portion 118 of handlebar 34. A wing nut 138 positioned upon a bolt (not shown) on the central axis of the radially-toothed cylinders 130 and 134 maintain such in meshed or locked engagement. When it is desired that the position of either handgrip 126 be changed, the wing nut 138 need only be loosened, the handgrip moved, and the wing nut retightened.

Figure 6:
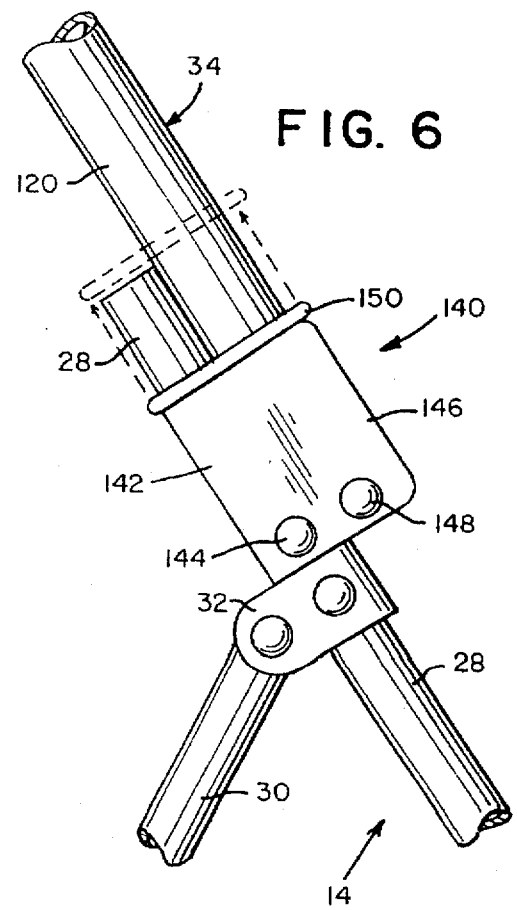
FIG. 6 is a side elevational view of a handlebar showing hinge details.

As illustrated in FIG. 6, each handlebar 34 is preferably secured by a hinge 140 to a corresponding forward leg 28 of frame 14. The preferred hinge 140 includes a C-shaped bracket 142 secured with a transverse pin 144 to the upper portion of forward leg 28. The upwardly extending flange ends 146 of the C-shaped bracket 142, in turn, carry a pivot pin 148 passing through the bottom of the lower portion 120 of handlebar 34.

A locking ring 150 is slidably positioned upon the forward leg 28 and the lower portion 120 of handlebar 34. When positioned against the top of bracket 142 as shown in FIG. 6, the locking ring 150 securely retains the handlebar 34 in an upright orientation. To fold or collapse the handlebar 34 against the forward leg 28, the locking ring 150 need only be moved upwardly to the position shown by broken lines in FIG. 6 to disengage it from the forward leg 28 thereby freeing the handlebar 34 for rotational movement.

Referring back to FIG. 1, the cart 10 may be seen to be provided with a flexible article carrier generally indicated at 12 preferably formed of any durable fabric such as woven nylon fiber. The flexible article carrier 12 defines a rectangular panel, the front and rear edges thereof being folded over and seamed to form sleeves 152 and 154 within which arms 58 and 88 are respectively received. Similarly, each side edge of the rectangular panel is folded over and seamed to form sleeves 156 and 158 for respectively receiving the forward arm 42 and rearward arm 44 of each longitudinal strut 40. The flexible article carrier 12, when unfolded, is so dimensioned that a taut, horizontal supporting surface is provided for carried articles such as groceries, small seating devices and the like. Of course, the upper lateral struts 56 and 86 as well as the flexible straps 20 and 22 help retain larger items upon the flexible article carrier 12 when the cart 10 is in use by forming a barrier to their movement.

The structural arrangement of the cart 10 as described hereinabove is such that no means for locking its frame 14 in an unfolded position is required. This is because the weight of the frame 14 and any goods carried upon the flexible article carrier 12 cause the frame to adopt a self-locking and stable configuration when rested on all four ground-engaging wheels 36 and 38.

By referring now to FIGS. 2, 3 and 4 of the drawings, the frame 14 of the cart 10 may be seen in a progressively collapsed or folded position for storage or transport in a relatively compact shape. By the application of an upward force to the flexible strap 22, or attached lateral strut 104, articulated movement of arms 58, 68, 88 and 92 will be accomplished thereby collapsing the cart 10 laterally as illustrated in FIG. 3. Similarly, by the application of an upward force to the flexible strap 20 at a position between the handlebars 34 will cause articulated movement of the longitudinal struts 40 so as to collapse the cart longitudinally as illustrated in FIG. 4.

Referring back to FIG. 1, the cart 10 may be seen to be provided with a selectively engageable, auxiliary carriage 16 for ready movement over uneven or unconsolidated surfaces such as sand or grass. Preferably, the carriage 16 includes a pair of spaced C-shaped platform members 200 secured together in parallel fashion by lateral arms 202 positioned at the opposing ends thereof. For strength, each of the lateral arms 202 preferably comprises a relatively short length of rectangular metallic tubing. Threaded fasteners 204 removably secure the arms 202 to the C-shaped platform members 200 and permit the auxiliary carriage 16 to be partially disassembled for storage when not in use.

Each of the C-shaped platform members 200 includes a horizontal base wall 206 dimensioned to carry and support the cart wheels 36 and 38 above the ground surface. A pair of integral side walls 208 extend downwardly at right angles from the base wall 206. Between the side walls 208 are positioned the plurality of ground-engaging rollers 18 for movement of the auxiliary carriage 16 over the ground surface. As shown, the free ends of the roller axles 210 are retained within corresponding holes through the side walls 208. To secure the roller axles 210 in place, their free ends are preferably flared outwardly to a diameter greater than that of the corresponding holes.

Each of the C-shaped platform members 200 is provided with a pair of wheel locks 212 for retaining the wheels 36 and 38 of cart 10 upon the base wall 206. As shown, each wheel lock 212 preferably includes a pair of wheel-retaining plates 214 secured to the opposed side walls 208 of a platform member 200 and extend upwardly therefrom. A connecting rod 216 having threaded ends is fitted through opposing holes 218 provided in the wheel-retaining plates 214 above the base wall 206 and secured in place by suitable wing nuts 220. Movably suspended upon the connecting rod 216 between the wheel-retaining plates 214 is a chock 222 for engagement with the cart frame 14.

The chock 222, which may be fabricated from lightweight plastic or any other suitable material, is provided with a shape that allows it to closely engage the cart frame 14 adjacent either one of the wheels 36 or 38. In this regard, the chock 222 has an opening 224 in its leading edge with a radius of curvature corresponding with that of the tubing utilized in the construction of forward and rearward legs 28 and 30. To permit a user to easily secure the chock 222 to the frame 14 at a point directly adjacent either of the wheels 36 or 38, it is preferable that the smallest spacing between the connecting rod 216 and opening 224 be equivalent to that of the wheel radius. With such a spacing, the wheel periphery cannot bind upon the connecting rod 216.

An elastomeric strap 226 is secured to the chock 222 for closing the opening 224 and retaining one of the legs 28 or 30 therein. While one end of the elastomeric strap 226 is permanently secured to the chock 222 in any suitable manner, the free end thereof is removably secured. Preferably, then, the free end of the elastomeric strap 226 includes a hole 228 adapted for receiving the portion of a pin 230 extending outwardly from the side of the chock 222 opposite that to which the elastomeric strap is permanently secured. Although not illustrated in the FIGS., in further embodiments of the invention, hook-and-loop fastening means may alternatively be substituted for the pin-type fastening arrangement described hereinabove.

The configuration of the auxiliary carriage 16 is adjustable so that it may be utilized in conjunction with walking aids other than cart 10. The wheel-retaining plates 214, for instance, are provided with a plurality of holes 218 for the selective positioning of the connecting rods 216 and suspended chocks 222. Thus, the chocks 222 may be repositioned to accommodate walking aids having frames and wheel configurations of disparate size and design. Additionally, the lateral arms 202 are provided with a plurality of laterally-spaced, transverse holes 232 for the passage of threaded fasteners 204. Thus, the distance between the platform members 200 may be increased or decreased to support walking aids of differing width by placing the threaded fasteners 204 in the holes 232 which provide the desired spacing.

While the invention has been described with a high degree of particularity, it will be appreciated by those skilled in the art that numerous modifications and substitutions may be made thereto. Therefore, it is to be understood that the present invention is not limited to the sole embodiment described above, but encompasses any and all embodiments within the scope of the following claims.

I claim:

1. A cart, comprising:

first side member having a first handlebar for grasping by a user;

a second side member having a second handlebar for grasping by a user;

a plurality of wheels carried on said first and second side members;

said first and second side members each including:
  a forward leg carrying one of said plurality of wheels;
  a rearward leg hingedly connected to said forward leg and carrying another of said plurality of wheels; and,
  a longitudinal strut having opposed ends, one of said ends secured to said forward leg and the other of said ends secured to said rearward leg;

a plurality of lateral struts joining said first and second side members together, each of said lateral struts including a first arm and a second arm having inner ends hingedly secured together, said first arm having an outer end hingedly secured to said first side member, and said second arm having an outer end secured to said second side member;

a first strap suspended between said first and second handlebars and connected to each of said lateral struts so that the application of an upward force to said first strap will cause articulated movement of said first and second arms collapsing the cart laterally; and, a flexible article carrier suspended from two of said plurality of lateral struts and suspended from each of said longitudinal struts.

2. The cart according to claim 1 wherein one of said plurality of lateral struts joins said first and second handlebars together and said first strap is suspended from said handlebar joining lateral strut.

3. The cart according to claim 1 wherein each of said plurality of longitudinal struts includes:
  a forward arm and a rearward arm hingedly secured together;
  said forward arm having an end hingedly secured to said forward leg; and,
  said rearward arm having an end secured to said rearward leg.

4. The cart according to claim 3 further comprising a second strap suspended between said first and second handlebars, said second strap having opposing ends connected to each of said longitudinal struts whereby the application of an upward force to said second strap at a position between said first and second handlebars will cause articulated movement of said forward and rearward arms collapsing the cart longitudinally.

5. The cart according to claim 1 wherein said first and second handlebars are pivotally secured, respectively, to said first and second side members.

6. The cart according to claim 5 wherein said first and second handlebars each include:
  a lower tubular portion having an opening therein;
  an upper portion slidably engaged within said opening; and,
  means for restricting the size of said opening so as to clamp said upper portion therein.

7. The cart according to claim 5 wherein said first and second handlebars each further include a handgrip pivotally secured to said upper portion.

8. The cart according to claim 1 further comprising:
  a pair of conjoined platform members having an upper surface adapted for receiving and supporting said cart above the ground surface;
  a plurality of ground-engaging rollers carried by each of said platform members; and,
  means for securing said first and second side members to said pair of platform members.

9. A collapsing cart, comprising:
first and second side members each including:
  a forward leg carrying a first wheel;
  a handlebar hingedly connected to said forward leg;
  a rearward leg hingedly connected to said forward leg and carrying a second wheel; and,
  a longitudinal strut having a forward arm and a rearward arm hingedly secured together, said forward arm having an end hingedly secured to said forward leg, and said rearward arm having an end hingedly secured to said rearward leg;

a plurality of lateral struts having a first arm and a second arm hingedly secured together, said first arm having a first outer end hingedly secured to said first side member, and said second arm having a second outer end secured to said second side member;

a first strap suspended between said handlebars and connected to each of said lateral struts so that an application of an upward force to said first strap will cause articulated movement of said first and second arms collapsing the cart laterally; and, a flexible article carrier carried by at least two of said plurality of lateral struts and said longitudinal struts.

10. The cart according to claim 9 wherein one of said plurality of lateral struts joins said first and second handlebars together and said first strap is suspended from said handlebar joining lateral strut.

11. The collapsing cart according to claim 9 further comprising a second strap suspended between said handlebars and connected to each of said longitudinal struts so that an application of an upward force to said second strap at a position between said first and second handlebars will cause articulated movement of said forward and rearward arms collapsing the cart longitudinally.

12. A collapsible cart, comprising:
first and second side members each including:
  a forward leg carrying a first wheel;
  a handlebar hingedly connected to said forward leg;
  a rearward leg hingedly connected to said forward leg and carrying a second wheel; and,
  a longitudinal strut having a forward arm and a rearward arm hingedly secured together, said forward arm having an end hingedly secured to said forward leg, and said rearward arm having an end hingedly secured to said rearward leg;

a pair of first, vertically-spaced, lateral struts each having a first arm and a second arm hingedly secured together, said first arm of each of said first lateral struts having an end hingedly secured to said forward leg of said first side member, and said second arm of each of said first lateral strut having an end hingedly secured to said forward leg of said second side member;

a pair of second, vertically-spaced, lateral struts each having a third arm and a fourth arm hingedly secured together, said third arm of each of said second lateral struts having an end hingedly secured to said rearward leg of said first side member, and said fourth arm of each of said second lateral struts having an end hingedly secured to said rearward leg of said second side member;

a third lateral strut having a fifth arm and a sixth arm hingedly secured together, said fifth arm having an end hingedly secured to said handlebar of said first side member, and said sixth arm having an end hingedly secured to said handlebar of said second side member; and, a flexible article carrier suspended between the lower one of said first lateral struts, the lower one of said second lateral struts and said longitudinal struts.

13. The cart according to claim 12 further comprising a first strap suspended from said third lateral strut, said first strap being connected at one end to said pair of first lateral struts and being connected at another end to said pair of second lateral struts whereby the application of an upward force to either the fifth or sixth arm of said third lateral strut will cause articulated movement of said first and second arms of said pair of first lateral struts and articulated movement of said third and fourth arms of said pair of second lateral struts to collapse said cart laterally.

14. The cart according to claim 12 further comprising a second strap suspended from said third lateral strut, said second strap being connected at its opposite ends to each of said longitudinal struts whereby an application of an upward force to either the fifth or sixth arm of said third lateral strut will cause articulated movement of said forward and rearward arms of said longitudinal struts to collapse said cart longitudinally.

15. The cart according to claim 12 further comprising:

a pair of laterally-spaced platform members each having a base wall adapted to support said first and second wheels of a respective one of said side members above the ground surface, each of said platform members also having a pair of side walls integral with said base wall and extending downwardly at right angles therefrom;

a pair of rigid arms joining said platform members together;

a plurality of ground-engaging rollers rotatably secured between said side walls of each of said platform members;

a pair of first chocks each being respectively secured to one of said platform members, each of said first chocks being adapted to engage said forward leg of one of said side members;

a pair of second chocks each being respectively secured to one of said platform members, each of said second chocks being adapted to engage said rearward leg of one of said side members;

a pair of first elastomeric straps each being respectively secured to one of said first chocks, each of said first elastomeric straps also being adapted to encircle and retain said forward leg of one of said side members; and, a pair of second elastomeric straps each being respectively secured to one of said second chocks, each of said second elastomeric straps also being adapted to encircle and retain said rearward leg of one of said side members.

* * * * *